(12) United States Patent
Tomita (10) Patent No.: US 11,908,620 B2
(45) Date of Patent: Feb. 20, 2024

(54) SOLENOID

(71) Applicant: DENSO CORPORATION, Kariya (JP)

(72) Inventor: Syodai Tomita, Kariya (JP)

(73) Assignee: DENSO CORPORATION, Kariya (JP)

( * ) Notice: Subject to any disclaimer, the term of this patent is extended or adjusted under 35 U.S.C. 154(b) by 233 days.

(21) Appl. No.: 17/563,592

(22) Filed: Dec. 28, 2021

(65) Prior Publication Data

US 2022/0122753 A1 Apr. 21, 2022

Related U.S. Application Data

(63) Continuation of application No. PCT/JP2020/024640, filed on Jun. 23, 2020.

(30) Foreign Application Priority Data

Jul. 1, 2019 (JP) .................................. 2019-122681

(51) Int. Cl.
| | |
|---|---|
| *F16K 31/06* | (2006.01) |
| *H01F 7/08* | (2006.01) |
| *H01F 7/128* | (2006.01) |
| *F16K 11/07* | (2006.01) |
| *H01F 7/16* | (2006.01) |

(52) U.S. Cl.
CPC .............. *H01F 7/081* (2013.01); *F16K 11/07* (2013.01); *F16K 31/0613* (2013.01); *F16K 31/0675* (2013.01); *F16K 31/0693* (2013.01); *H01F 7/128* (2013.01); *H01F 7/1607* (2013.01); *F16K 31/06* (2013.01); *H01F 2007/085* (2013.01)

(58) Field of Classification Search
CPC ........ H01F 7/081; H01F 7/128; H01F 7/1607; H01F 2007/085; F16K 11/07; F16K 31/0693; F16K 31/06; F16K 31/0675; F16K 31/061; F16K 31/0613
USPC ..................................... 251/129.15; 335/255
See application file for complete search history.

(56) References Cited

U.S. PATENT DOCUMENTS

| | | | | |
|---|---|---|---|---|
| 8,134,436 | B2* | 3/2012 | Yasoshima | H01F 7/127 335/220 |
| 8,585,014 | B2* | 11/2013 | Oikawa | F16K 11/0716 251/129.15 |
| 9,076,583 | B2* | 7/2015 | Ando | H01F 7/127 |
| 2003/0030525 | A1* | 2/2003 | Sato | F16K 31/06 335/256 |
| 2006/0011245 | A1* | 1/2006 | Suzuki | F16K 31/0696 137/625.65 |
| 2006/0243938 | A1 | 11/2006 | Ishibashi | |
| 2014/0225690 | A1* | 8/2014 | Ando | H01F 7/1607 335/255 |

(Continued)

FOREIGN PATENT DOCUMENTS

JP 2020-88145 6/2020

*Primary Examiner* — John Bastianelli
(74) *Attorney, Agent, or Firm* — Nixon & Vanderhye P.C.

(57) ABSTRACT

A solenoid includes a coil portion and a yoke having a side surface portion along an axial direction so as to accommodate the coil portion. A gap in a radial direction that communicates a radial outside of a first magnetic flux transfer portion with an outside of the solenoid is formed between an inner surface of the side surface portion and an outer surface of the coil portion, and a protrusion is formed on at least one of an inner surface and an outer surface and protrudes in the radial direction to reduce a size of at least a part of the gap.

9 Claims, 8 Drawing Sheets

(56) References Cited

U.S. PATENT DOCUMENTS

2015/0048270 A1\* 2/2015 Bamber ................ B23P 15/001
  29/890.126
2018/0266581 A1\* 9/2018 Sugiura ............... F16K 31/0679

\* cited by examiner

SOLENOID

CROSS REFERENCE TO RELATED APPLICATIONS

This application is a continuation application of International Patent Application No. PCT/JP2020/024640 filed on Jun. 23, 2020, which designated the U.S. and based on and claims the benefits of priority of Japanese Patent Application No. 2019-122681 filed on Jul. 1, 2019, The entire disclosure of all of the above applications is incorporated herein by reference.

TECHNICAL FIELD

The present disclosure relates to a solenoid.

BACKGROUND

Conventionally, a solenoid has a coil that generates a magnetic force when energized, a stator core provided inside the coil, and a plunger that slides inside the stator core.

SUMMARY

The present disclosure can be realized as the following embodiments.

According to one aspect of the present disclosure, a solenoid is provided.

The solenoid includes
a coil portion having a coil that generates a magnetic flux when energized,
a yoke having a side surface portion along an axial direction, and a bottom portion formed along a direction intersecting the axial direction, and accommodating the coil portion,
a columnar plunger that slides inside the core portion in the radial direction in the axial direction,
a magnetic attraction core arranged in the axial direction to face a distal end of the plunger and configured to attract magnetically the plunger by a magnetic force generated by the coil,
a first magnetic flux transfer portion configured to transfer a magnetic flux between the yoke and the core portion on a radial outside of a core end portion, which is the axial end of the core portion and faces the bottom portion,
a second magnetic flux transfer portion configured to transfer the magnetic flux between the magnetic attraction core and the side surface portion on a radial outside of the magnetic flux that is disposed radially outside a magnetic attraction core end portion, which is an end in the axial direction of the magnetic attraction core and is opposite to a side facing the distal end portion, and
a magnetic flux passage suppressing portion configured to suppress a passage of magnetic flux between the core portion and the magnetic attraction core.

A gap in the radial direction that communicates a radial outside of the first magnetic flux transfer portion with an outside of the solenoid is formed between an inner surface of the side surface portion and an outer surface of the coil portion, and a protrusion is formed on at least one of the inner surface and the outer surface and protrudes in the radial direction to reduce a size of at least a part of the gap.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

In an assumable example, a solenoid has a coil that generates a magnetic force when energized, a stator core provided inside the coil, and a plunger that slides inside the stator core. In the solenoid, the coil, the stator core, and the plunger are housed in a bottomed tubular yoke. Further, as a breathing passage that communicates a plunger chamber in which the plunger is arranged and an outside of the solenoid, a radial gap is formed between an inner surface of the yoke and an outer surface of the coil.

In the solenoid, when a member housed inside the yoke is inserted through an opening of the yoke and assembled inside the yoke, the member is eccentric with respect to the yoke due to a radial gap as the breathing passage, and an assemblability may deteriorate. Therefore, a technique capable of suppressing deterioration of the assemblability of the solenoid due to the radial gap is desired.

The present disclosure can be realized as the following embodiments.

According to one aspect of the present disclosure, a solenoid is provided.

The solenoid includes
a coil portion having a coil that generates a magnetic flux when energized,
a yoke having a side surface portion along an axial direction, and a bottom portion formed along a direction intersecting the axial direction, and accommodating the coil portion,
a columnar plunger that slides inside the core portion in the radial direction in the axial direction,
a magnetic attraction core arranged in the axial direction to face a distal end of the plunger and configured to attract magnetically the plunger by a magnetic force generated by the coil,
a first magnetic flux transfer portion configured to transfer a magnetic flux between the yoke and the core portion on a radial outside of a core end portion, which is the axial end of the core portion and faces the bottom portion,
a second magnetic flux transfer portion configured to transfer the magnetic flux between the magnetic attraction core and the side surface portion on a radial outside of the magnetic flux that is disposed radially outside a magnetic attraction core end portion, which is an end in the axial direction of the magnetic attraction core and is opposite to a side facing the distal end portion, and a magnetic flux passage suppressing portion configured to suppress a passage of magnetic flux between the core portion and the magnetic attraction core.

A gap in the radial direction that communicates a radial outside of the first magnetic flux transfer portion with an outside of the solenoid is formed between an inner surface of the side surface portion and an outer surface of the coil portion, and a protrusion is formed on at least one of the inner surface and the outer surface and protrudes in the radial direction to reduce a size of at least a part of the gap.

According to the solenoid in this form, the protrusion is formed on at least one of the inner surface of the side surface portion and the outer surface of the coil portion and protrudes in the radial direction to reduce a size of at least a part of the gap between the inner surface of the side surface portion and the outer surface of the coil portion. Therefore, it is possible to prevent the member housed inside the yoke from being eccentric with respect to the yoke due to such a gap when assembling the solenoid, so that deterioration of the solenoid assemblability can be suppressed.

A. First Embodiment

Figure 1:
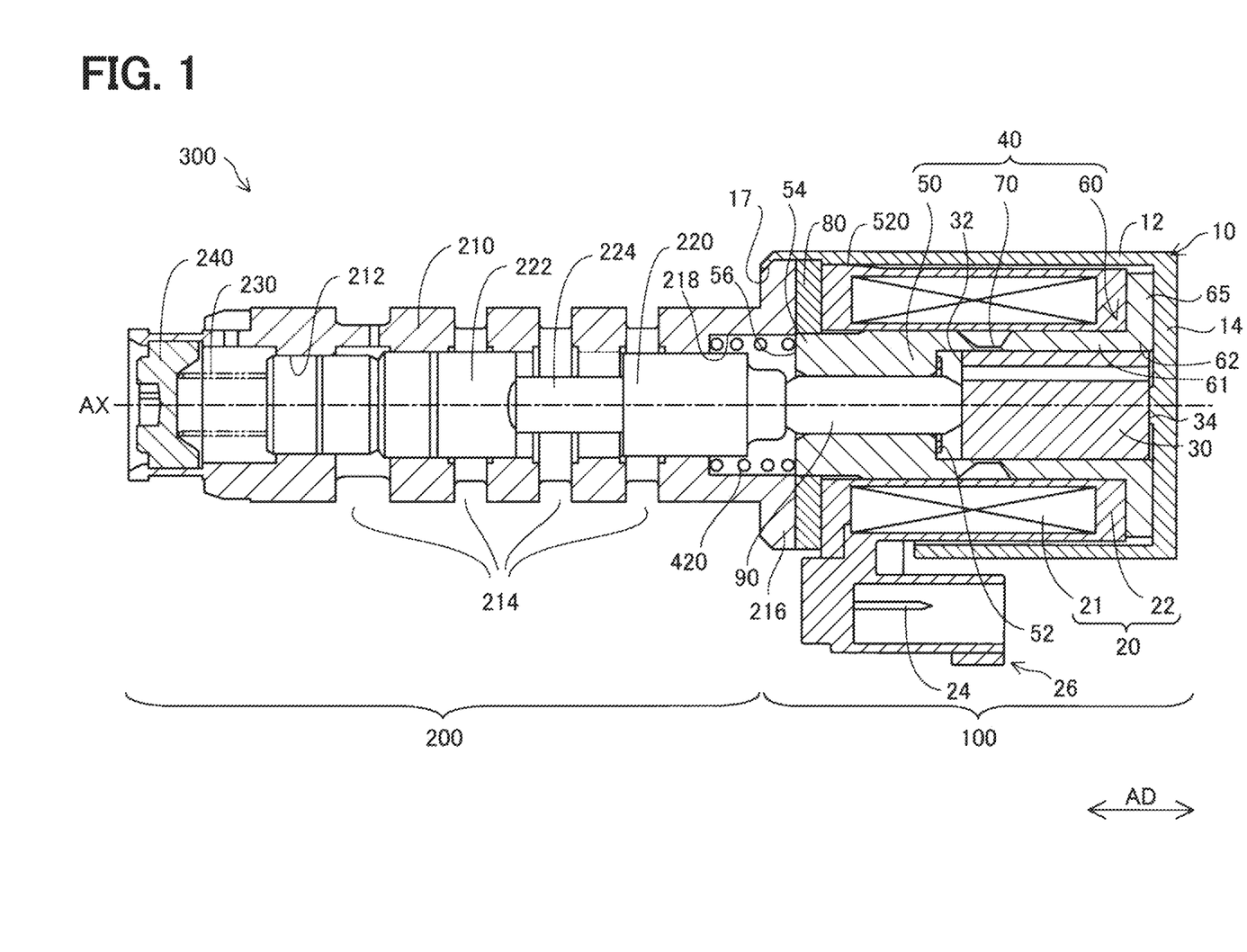
FIG. 1 is a cross-sectional view showing a schematic configuration of a linear solenoid valve to which a solenoid according to a first embodiment is applied.

A solenoid 100 according to the first embodiment shown in FIG. 1 is applied to a linear solenoid valve 300 and functions as an actuator for driving a spool valve 200. The linear solenoid valve 300 is configured to control a hydraulic pressure of hydraulic oil supplied to a vehicle automatic transmission (not shown), and is mounted on a valve body provided on an outer surface of a transmission case (not shown). FIG. 1 schematically shows a cross section of the linear solenoid valve 300 taken along a central axis AX.

Figure 2:
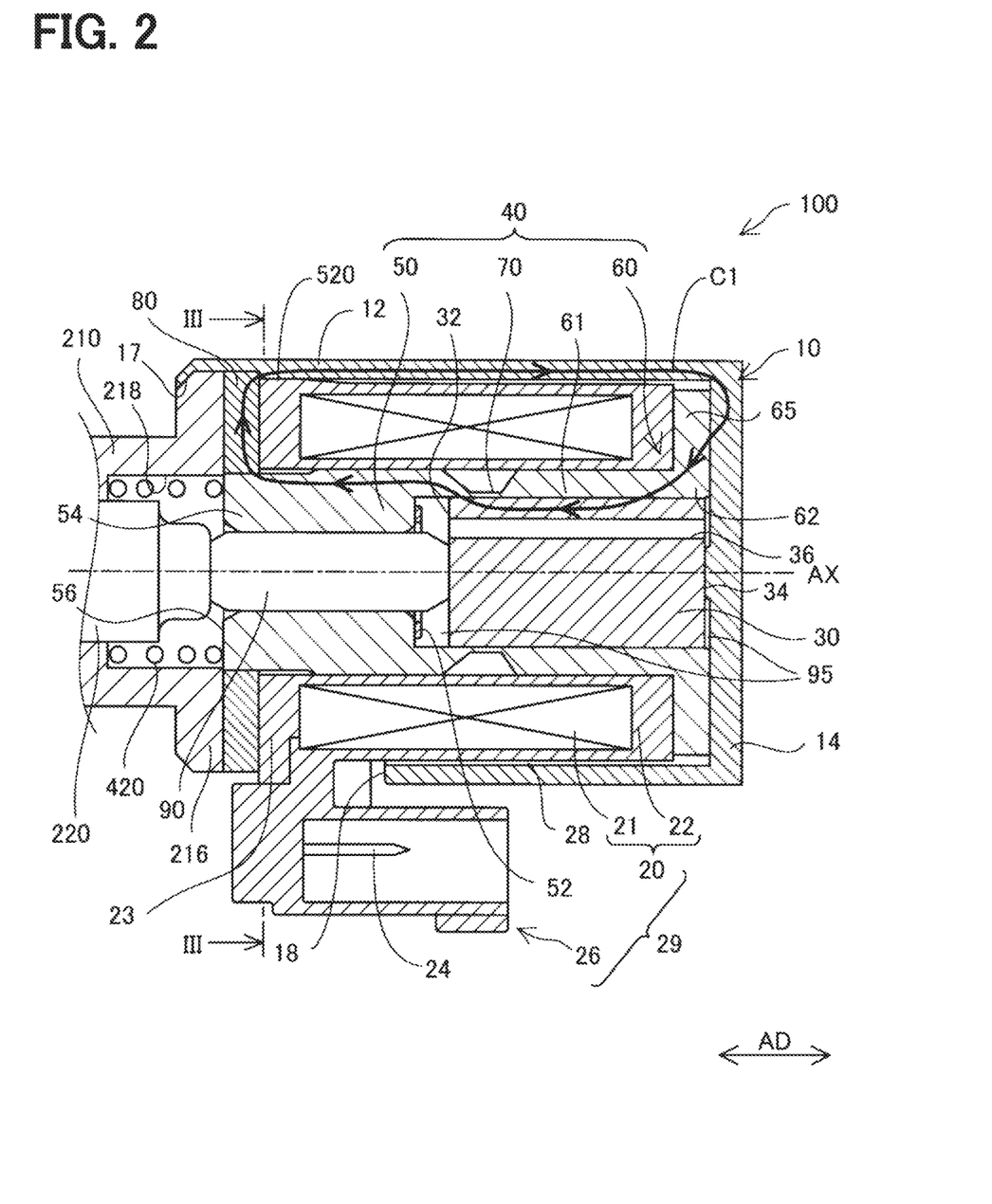
FIG. 2 is a sectional view showing a detailed configuration of a solenoid.

The linear solenoid valve 300 includes a spool valve 200 and a solenoid 100 arranged side by side along the central axis AX. FIGS. 1 and 2 show the solenoid 100 and the linear solenoid valve 300 in a non-energized state, Although the linear solenoid valve 300 of the present embodiment is a normally closed type, it may be a normally open type.

The spool valve 200 shown in FIG. 1 adjusts an opening area of a plurality of oil ports 214 described later. The spool valve 200 includes a sleeve 210, a spool 220, a spring 230, and a spring load adjusting member 240.

The sleeve 210 has a substantially cylindrical external shape. The sleeve 210 is formed with an insertion hole 212 penetrating along the central axis AX and a plurality of oil ports 214 communicating with the insertion hole 212 and opening in a radial direction. The spool 220 is inserted into the insertion hole 212. An end of the insertion hole 212 on the solenoid 100 side is formed to have an enlarged diameter and functions as an elastic member accommodating portion 218. An elastic member 420 described later is accommodated in the elastic member accommodating portion 218. The plurality of oil ports 214 are formed side by side along a direction parallel to the central axis AX. The direction is hereinafter referred to as "axial direction AD". The plurality of oil ports 214 function as, for example, an input port, an output port, a feedback port, a drain port, and the like. The input port communicates with an oil pump (not shown) to receive a hydraulic pressure. The output port communicates with a clutch piston (not shown) to supply a hydraulic pressure. The feedback port applies a load to the spool 220 based on the output hydraulic pressure. The drain port discharges the hydraulic oil, A flange 216 is formed at an end of the sleeve 210 on the solenoid 100 side. The flange 216 has a diameter that increases radially outward, and is fixed to a yoke 10 of the solenoid 100 described later. In the present embodiment, a radial direction means a direction orthogonal to the axial direction AD.

The spool 220 has a plurality of large-diameter portions 222 and small-diameter portion 224 arranged side by side along the axial direction AD, and has a substantially rod-like external shape. The spool 220 slides along the axial direction AD inside the insertion hole 212, and adjusts the opening area of the plurality of oil ports 214 according to a position along the axial direction AD between the large-diameter portion 222 and the small-diameter portion 224. A shaft 90 for transmitting a thrust of the solenoid 100 to the spool 220 is in contact with the end of the spool 220 on the solenoid 100 side. The spring 230 is arranged at the other end of the spool 220. The spring 230 is configured by a compression coil spring, and presses the spool 220 in the axial direction AD to urge the spool 220 toward the solenoid 100. The spring load adjusting member 240 is arranged in contact with the spring 230, and adjusts the spring load of the spring 230 by adjusting an amount of screwing into the sleeve 210.

The solenoid 100 shown in FIGS. 1 and 2 is energized by an electronic control unit (not shown) to drive the spool valve 200. The solenoid 100 includes a yoke 10, a coil portion 20, a connector portion 26, a plunger 30, a stator core 40, a ring member 80, and an elastic member 420.

The yoke 10 is made of a magnetic metal, and forms an outer shell of the solenoid 100 as shown in FIG. 2. The yoke 10 has a bottomed cylindrical external shape, and accommodates the coil portion 20, the plunger 30, and the stator core 40. The yoke 10 has a side surface portion 12, a bottom portion 14, an opening 17, and a notch 18.

The side surface portion 12 has a substantially cylindrical external shape along the axial direction AD, and is disposed radially outside the coil portion 20.

The bottom portion 14 is formed at the end of the side surface portion 12 and perpendicular to the axial direction AD at the end of the side surface portion 12 opposite to the end opposite to the spool valve 200, and closes the end of the side surface portion 12. The bottom portion 14 is not limited to being perpendicular to the axial direction AD, and may be formed substantially perpendicularly, or may be formed to intersect with the axial direction AD according to the shape of a magnetic flux transfer portion 65 described later. The bottom portion 14 faces a base end portion 34 of the plunger 30, which will be described later. A detailed description of the bottom portion 14 will be described later. In the following description, a space surrounded by the bottom portion 14, the stator core 40, and the shaft 90 is also referred to as a "plunger chamber 95". The plunger chamber 95 houses the plunger 30.

The opening 17 is formed at an end of the side surface portion 12 on the spool valve 200 side. The opening 17 is caulked and fixed to a flange 216 of the spool valve 200 after the components of the solenoid 100 are assembled inside the yoke 10, The spool valve 200 and the yoke 10 may be fixed by using an arbitrary method such as welding, instead of fixing by caulking.

Figure 3:
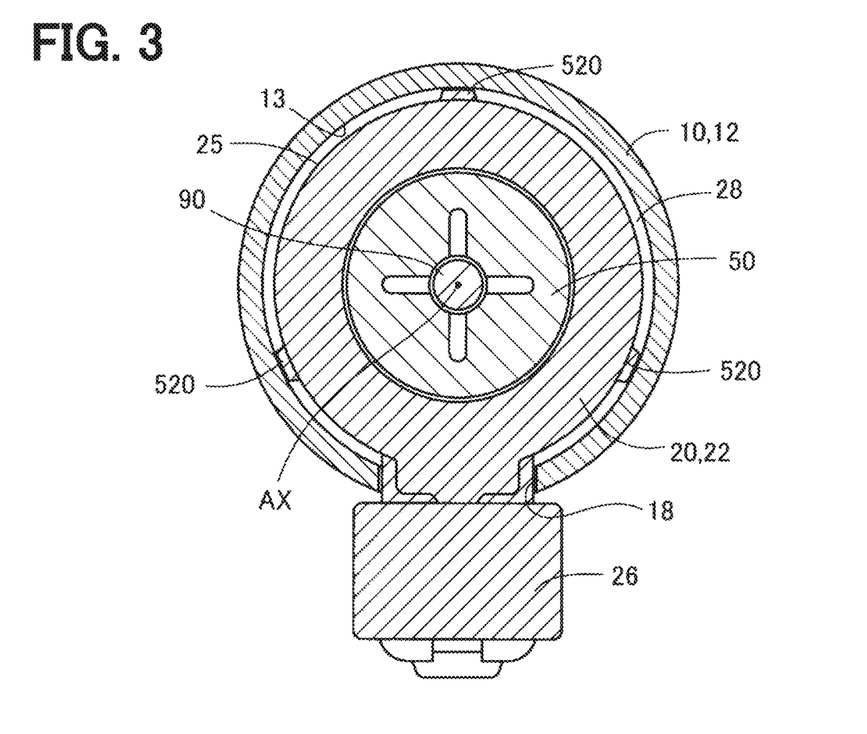
FIG. 3 is a cross-sectional view taken along a line in FIG. 2.

As shown in FIG. 3, the notch 18 is formed by cutting out a part of the opening 17 in the circumferential direction. A connector portion 26, which will be described later, is exposed from the yoke 10 via the notch 18. Further, the notch 18 functions as an inflow for flowing a fluid existing in a mounting environment of the solenoid 100 from the outside of the solenoid 100 into the inside of the solenoid 100. The fluid existing in the mounting environment of the solenoid 100 corresponds to a fluid such as hydraulic oil or air. The fluid that has flowed into the solenoid 100 through the notch 18 flows out to the outside of the solenoid 100 through the notch 18.

As shown in FIGS. 1 and 2, the coil portion 20 is arranged inside the side surface portion 12 of the yoke 10 in the radial direction. The coil portion 20 has a coil 21 and a bobbin 22. The coil 21 is formed of a conducting wire having an insulating coating. The coil 21 generates a magnetic force when energized, and generates a loop-shaped magnetic flux passing through the side surface portion 12 of the yoke 10, the bottom portion 14 of the yoke 10, the stator core 40, the plunger 30, and the ring member 80. (a loop-shaped magnetic flux is hereinafter, referred to as "magnetic circuit"). In the state shown in FIGS. 1 and 2, the energization of the coil portion 20 is not performed and a magnetic circuit is not formed. For convenience of explanation, a part of the magnetic circuit C1 formed when the energization of the coil portion 20 is performed is schematically indicated by a thick arrow in FIG. 2. The bobbin 22 is made of resin, and the coil 21 is wound around the bobbin 22. The coil portion 20 is connected to the connector portion 26 at the end of the coil portion 20 in the axial direction AD on the side where the ring member 80 is arranged (hereinafter, also referred to as "coil portion end 23").

As shown in FIG. 3, the connector portion 26 is exposed from the yoke 10 via the notch 18, The connector portion 26 has a function of electrically connecting the coil 21 and the electronic control unit. As shown in FIG. 2, a connection terminal 24 to which the end of the coil 21 is connected is arranged inside the connector portion 26. In the following description, the coil portion 20 and the connector portion 26 are collectively referred to as a "energized portion 29".

As shown in FIG. 3, an outer diameter of the coil portion 20 is formed smaller than an inner diameter of the side surface portion 12 of the yoke 10. With such a configuration, a radial gap is formed over the entire circumference between an inner surface 13 of the side surface portion 12 and an outer surface 25 of the coil portion 20. Such a gap functions as a breathing path 28 that communicates the radial outside of the magnetic flux transfer portion 65, which will be described later, with the outside of the solenoid 100. The breathing path 28 communicates with the outside of the solenoid 100 through the notch 18 of the yoke 10 to circulate the fluid existing in the mounting environment of the solenoid 100. For example, in the mounting environment of the solenoid 100, when the notch 18 is immersed in the hydraulic oil, the hydraulic oil as a fluid is circulated, and when the notch 18 is located vertically above the storage level of the hydraulic oil, the air as a fluid is circulated.

Figure 4:
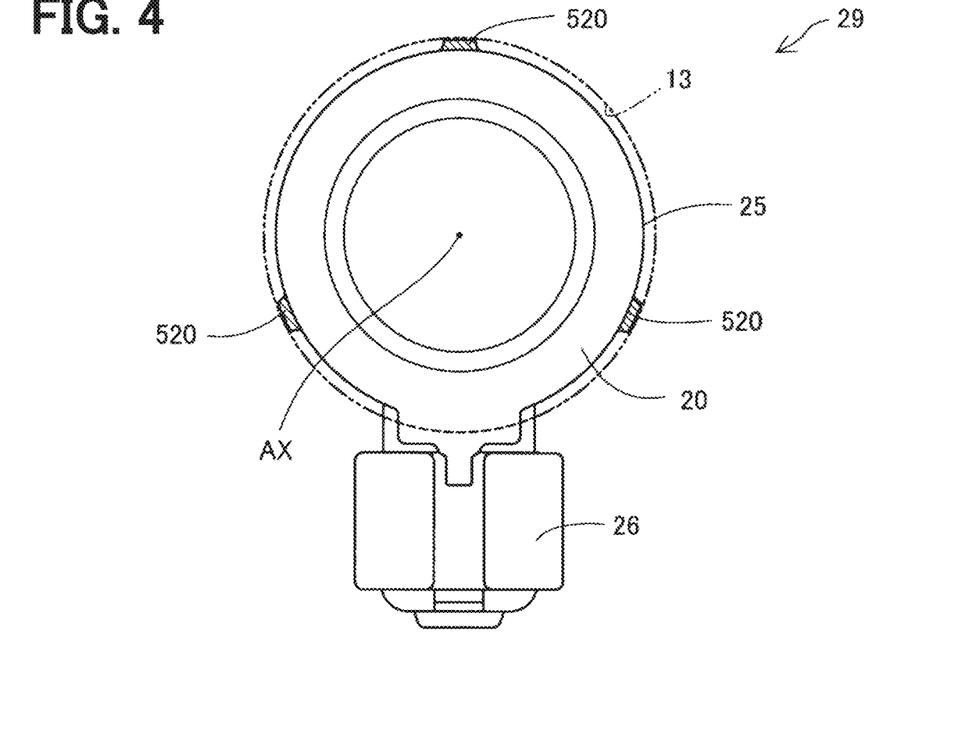
FIG. 4 is a front view showing an energized portion.
Figure 5:
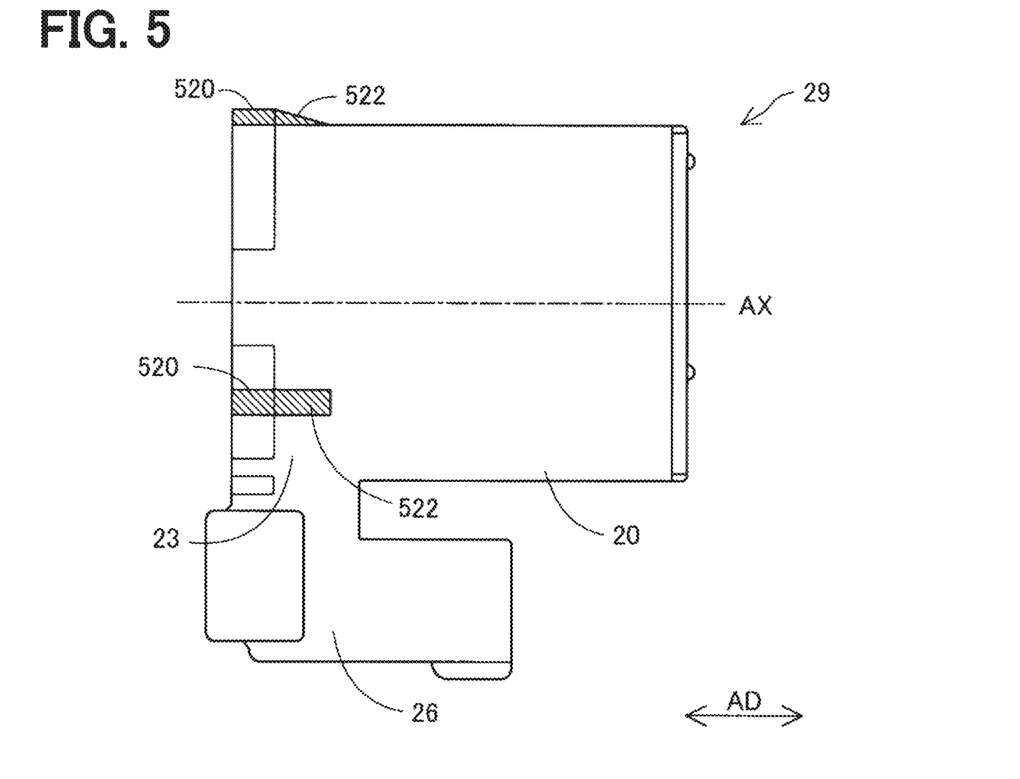
FIG. 5 is a side view showing the energized portion.

As shown in FIGS. 3 and 4, in the present embodiment, three protrusions 520 projecting outward in the radial direction are formed on the outer surface 25 of the coil portion 20. The three protrusions 520 are formed so as to be arranged at substantially equal intervals in the circumferential direction so as to surround the central axis AX. More specifically, one protrusion 520 is formed at a position rotated by 180° with respect to the circumferential position of the connector portion 26, and the other two protrusions 520 are formed at positions shifted by about 120° with respect to the position of the protrusion 520 in the circumferential direction. In the present embodiment, a "position surrounding the central axis AX" means that, of the three protrusions 520, both of the two protrusions 520 adjacent to each other in the circumferential direction are formed at intervals of less than 180°. In FIG. 4 and FIG. 5 described later, each protrusion 520 is shown with hatching for convenience of illustration. Further, in FIG. 4, for convenience of explanation, the inner surface 13 of the side surface portion 12 of the yoke 10 is shown by a chain double-dashed line. As will be described later, each protrusion 520 has a function of reducing the size of a part of the breathing path 28.

As shown in FIG. 5, each protrusion 520 is formed at a position where it overlaps with the end 23 of the coil portion in the radial direction. Each protrusion 520 has substantially the same configuration as each other, and each has a tapered portion 522. The tapered portion 522 is formed on the bottom portion 14 side of the protrusion 520 in the axial direction AD. The tapered portion 522 is formed in a tapered shape having a slope from the inside to the outside in the radial direction from the bottom portion 14 side toward the spool valve 200 side shown in FIG. 1 in the axial direction AD. As will be described later, the tapered portion 522 has a function of suppressing deterioration of the assemblability of the solenoid 100. As shown in FIG. 4, each of the protrusions 520 of the present embodiment is in contact with the inner surface 13 of the side surface portion 12 at a portion formed with the largest diameter. A slight radial gap may be formed between the most enlarged diameter portion of each protrusion 520 and the inner surface 13.

As shown in FIG. 2, the plunger 30 is housed in a plunger chamber 95. The plunger 30 has a substantially cylindrical external shape and is made of a magnetic metal. The plunger 30 slides in the axial direction AD on an inner peripheral surface of a core portion 61 of the stator core 40 described later. The above-described shaft 90 is disposed in contact with an end portion of the plunger 30 on the spool valve 200 side (hereinafter, also referred to as a "distal end portion 32"). Thereby, the plunger 30 is urged toward the bottom portion 14 side of the yoke 10 along the axial direction AD by the urging force of the spring 230 transmitted to the spool 220 shown in FIG. 1. As shown in FIG. 2, the end portion of the plunger 30 opposite to the distal end portion 32 (hereinafter, also referred to as "base end portion 34") faces the bottom portion 14 of the yoke 10. The plunger 30 is formed with a breathing hole 36 penetrating in the axial direction AD. The breathing hole 36 allows the fluid located on the base end portion 34 side and the distal end portion 32 side of the plunger 30 to flow in the plunger chamber 95.

The Stator core 40 is made of a magnetic metal, and is disposed between the coil portion 20 and the plunger 30. The stator core 40 of the present embodiment is configured by a member in which a magnetic attraction core 50, a sliding core 60, and a magnetic flux passage suppressing portion 70 are integrated.

The magnetic attraction core 50 is disposed so as to surround the shaft 90 in a circumferential direction. The magnetic attraction core 50 constitutes a portion of the stator core 40 on the spool valve 200 side, and magnetically attracts the plunger 30 by the magnetic force generated by the coil portion 20, A stopper 52 is disposed on a surface of the magnetic attraction core 50 facing the distal end portion 32 of the plunger 30. The stopper 52 is made of a non-magnetic material, and suppresses a direct contact between the plunger 30 and the magnetic attraction core 50, and also prevents the plunger 30 from being separated from the magnetic attraction core 50 due to the magnetic attraction.

The sliding core 60 constitutes a portion of the stator core 40 on the bottom portion 14 side, and is disposed radially outside the plunger 30. The sliding core 60 has a core portion 61 and a magnetic flux transfer portion 65. In the present embodiment, the core portion 61 and the magnetic flux transfer portion 65 are integrally formed.

The core portion 61 has a substantially cylindrical shape, and is arranged between the coil portion 20 and the plunger 30 in the radial direction. The core portion 61 guides the movement of the plunger 30 along the axial direction AD. As a result, the plunger 30 slides directly on an inner peripheral surface of the core portion 61. There is a sliding gap (not shown) between the core portion 61 and the plunger 30 for ensuring the slidability of the plunger 30. An end portion of the sliding core 60 that is located on an opposite side to the magnetic attraction core 50 side (hereinafter, also referred to as a core end portion 62") is in contact with the bottom portion 14.

The magnetic flux transfer portion 65 is formed radially outward from the core end portion 62 over the entire circumference of the core end portion 62. Therefore, the magnetic flux transfer portion 65 is arranged between the bobbin 22 and the bottom portion 14 of the yoke 10 in the axial direction AD. The magnetic flux transfer portion 65 transfers magnetic flux between the yoke 10 and the plunger 30 via the core portion 61. The magnetic flux transfer portion 65 of the present embodiment transfers magnetic flux between the bottom portion 14 of the yoke 10 and the plunger 30. The magnetic flux transfer portion 65 may transfer magnetic flux between the side surface portion 12 of the yoke 10 and the plunger 30. The magnetic flux transfer portion 65 of the present embodiment is formed integrally with the core portion 61. The magnetic flux transfer portion 65 and the core portion 61 may be integrated after being formed as separate bodies from each other. For example, the core portion 61 may be press-fitted into a through hole of the magnetic flux transfer portion 65 formed in a ring shape, or may be fixed by welding or the like after the core portion 61 is inserted into the through hole. A breathing groove (not shown) is formed on the surface of the magnetic flux transfer portion 65 facing the bottom portion 14 of the yoke 10. Such a breathing groove communicates the inside and the outside of the magnetic flux transfer portion 65 in the radial direction. Therefore, the plunger chamber 95 and the outside of the solenoid 100 are communicated with each other through the breathing groove and the breathing path 28. With such a configuration, the pressure fluctuation of the plunger chamber 95 is suppressed due to the sliding of the plunger 30, and it is suppressed that the smooth sliding of the plunger 30 is hindered.

A magnetic flux passage suppressing portion 70 shown in FIG. 2 is formed between the magnetic attraction core 50 and the core portion 61 in the axial direction AD. The magnetic flux passage suppressing portion 70 suppresses the flow of magnetic flux directly between the core portion 61 and the magnetic attraction core 50. The magnetic flux passage suppressing portion 70 of the present embodiment is configured such that a radial thickness of the stator core 40 is formed to be thin, so that the magnetic resistance of the magnetic flux passage suppressing portion 70 is higher than that of the magnetic attraction core 50 and the core portion 61.

The ring member 80 is arranged between the coil portion 20 and the flange 216 of the spool valve 200 in the axial direction AD. In other words, the ring member 80 is disposed radially outward of an end of the magnetic attraction core 50 of the stator core 40 (described later) in the axial direction AD, and an end opposite to the plunger 30 side. The end is hereinafter also referred to as "magnetic attraction core end 54". The ring member 80 has a ring-like external shape and is made of a magnetic metal. The ring member 80 transfers a magnetic flux between the magnetic attraction core 50 of the stator core 40 and the side surface portion 12 of the yoke 10. The ring member 80 is configured to be displaceable in the radial direction. As a result, variations in the dimensions of the stator core 40 during manufacture and imperfect alignment of the stator core 40 during assembly are absorbed. In the present embodiment, the magnetic attraction core 50 is fitted in a through hole of the ring member 80 with a slight radial gap. Not limited to fitting, the magnetic attraction core 50 may be press-fitted into the through hole of the ring member 80.

The elastic member 420 is accommodated in an elastic member accommodating portion 218 formed in the sleeve 210 of the spool valve 200 and urges the stator core 40 toward the bottom portion 14. The elastic member 420 is disposed in contact with an end surface (hereinafter, also referred to as the "end surface 56") of the magnetic attraction core 50 in the axial direction AD and opposite to the plunger 30 side. In the present embodiment, the elastic member 420 is configured by a compression coil spring having a substantially cylindrical external shape. The spool 220 is inserted radially inside the elastic member 420. Since the stator core 40 is urged in the axial direction AD toward the bottom portion 14 of the yoke 10 by the elastic member 420, the first magnetic flux transfer portion 65 is pressed against the bottom portion 14, and the magnetic flux transfer portion 65 is pressed to the bottom portion 14. Therefore, the loss of the magnetic flux transmitted from the bottom portion 14 of the yoke 10 to the magnetic flux transfer portion 65 is suppressed.

In the present embodiment, the ring member 80, the yoke 10, the plunger 30, and the stator core 40 are each made of iron. They are not limited to iron, they may be composed of any magnetic material such as nickel and cobalt. In the present embodiment, plating is applied on the outer peripheral surface of the plunger 30. By such a plating treatment, the surface hardness of the plunger 30 can be increased, and deterioration of slidability can be suppressed. Further, in the present embodiment, the yoke 10 is formed by press molding and the stator core 40 is formed by forging, but each may be formed by any molding method. For example, the yoke 10 may be integrated by caulking fixing, press-fitting fixing, or the like after the side surface portion 12 and the bottom portion 14 are formed separately from each other.

The solenoid 100 of the present embodiment is assembled by inserting members housed inside the yoke 10 in order from the opening 17 of the yoke 10. More specifically, first, the stator core 40 in which the plunger 30 is housed inside the core portion 61 in the radial direction is inserted from the opening 17 into the inside of the yoke 10. Next, the energized portion 29 is inserted, and the ring member 80 is inserted. After that, the opening 17 is fixed to the flange 216 of the spool valve 200, so that the assembly of the solenoid 100 is completed.

As described above, the outer diameter of the coil portion 20 is formed to be smaller than the inner diameter of the side surface portion 12 of the yoke 10. Here, on the outer surface 25 of the coil portion 20, three protrusions 520 projecting outward in the radial direction are formed side by side in the circumferential direction. Therefore, when assembling the solenoid 100, a part of the radial gap between the inner surface 13 of the side surface portion 12 of the yoke 10 and the outer surface 25 of the coil portion 20 is reduced by the three protrusions 520. Therefore, when the solenoid 100 is assembled, it is suppressed that each member housed inside the yoke 10 is eccentric with respect to the yoke 10 due to the radial gap as the breathing path 28. More specifically, since the eccentricity of the coil portion 20 with respect to the yoke 10 can be suppressed, the eccentricity of the stator core 40 can be suppressed, and as a result, the eccentricity of the ring member 80 can be suppressed. Therefore, it is possible to suppress deterioration of the assemblability of the solenoid 100 due to the radial gap between the inner surface 13 and the outer surface 25.

The three protrusions 520 are formed so as to be arranged in the circumferential direction at a position where they overlap with the coil portion end 23 in the radial direction, and are formed at a position which does not overlap with a circumferential position of the connector portion 26. Therefore, the fluid flowing in or out of the notch 18 can pass through the radial gap between the inner surface 13 and the outer surface 25. That is, each protrusion 520 reduces the size of a part of the radial gap as the breathing path 28 at a position where the function of the breathing path 28 can be suppressed from being hindered. Since the protrusion 520 has the tapered portion 522, the dimension of the radial gap between the inner surface 13 and the outer surface 25 is gradually reduced along the direction from the base end portion 34 to the distal end portion 32 of the plunger 30 in the range in which the tapered portion 522 is formed in the axial direction AD. Therefore, when assembling the solenoid 100, in the dimension of the radial gap around the opening 17, the dimension in the state where the insertion of the coil portion 20 is started is larger than the dimension in the state where the insertion of the coil portion 20 into the yoke 10 is completed. Therefore, the tapered portion 522 can guide the insertion of the coil portion 20.

An operation of the solenoid 100 will be described below. FIGS. 1 and 2 show a state in which the plunger 30 is farthest from the magnetic attraction core 50 without energizing the coil 21. Unlike the states shown in FIGS. 1 and 2, when the coil 21 is energized, a magnetic circuit C1 is formed inside the solenoid 100. The plunger 30 is drawn toward the magnetic attraction core 50 by the formation of the magnetic circuit C1 and slides on the inner peripheral surface of the core portion 61 in the axial direction AD. As the current flowing through the coil portion 20 increases, the magnetic flux density of the magnetic circuit C1 increases, and the stroke amount of the plunger 30 increases.

When the plunger 30 moves toward the magnetic attraction core 50, the shaft 90 abutting on the distal end portion 32 of the plunger 30 presses the spool 220 shown in FIG. 1 toward the spring 230. As a result, the opening area of the oil port 214 is adjusted, and a hydraulic pressure proportional to the value of the current flowing through the coil 21 is output.

In the present embodiment, the breathing path 28 corresponds to the gap in the present disclosure, the magnetic flux transfer portion 65 corresponds to the first magnetic flux transfer portion in the present disclosure, and the ring member 80 corresponds to the second magnetic flux transfer portion in the present disclosure.

According to the solenoid 100 of the first embodiment described above, the radial gap that communicates between the radial outside of the magnetic flux transfer portion 65 and the outside of the solenoid 100 is formed between the inner surface 13 of the side surface portion 12 and the outer surface 25 of the coil portion 20. The protrusion 520 is formed on the outer surface 25 of the coil portion 20 so as to project outward in the radial direction to reduce the size of a part of the radial gap. Therefore, when assembling the solenoid 100, it is possible to prevent each member housed inside the yoke 10 from being eccentric with respect to the yoke 10 due to such a gap. Therefore, it is possible to suppress deterioration of the assemblability of the solenoid 100 due to the radial gap between the inner surface 13 and the outer surface 25.

Further, since the protrusion 520 is formed on the outer surface 25 of the coil portion 20, it is possible to suppress the configuration of the side surface portion 12 of the yoke 10 from becoming complicated, and the yoke 10 can be easily formed by press molding. It is possible to suppress an increase in the cost required for manufacturing the yoke 10.

Further, since the protrusion 520 includes the tapered portion 522 having a slope extending from the inside to the outside in the radial direction from the base end portion 34 side to the distal end portion 32 side of the plunger 30 in the axial direction AD, when assembling the solenoid 100, it is possible to guide the insertion of the coil portion 20, Furthermore, it is possible to prevent the protrusion 520 and the opening 17 of the yoke 10 from colliding with each other. Therefore, deterioration of the assemblability of the solenoid 100 can be suppressed.

Further, since the plurality of protrusions 520 are formed along the circumferential direction, the stress applied to the coil 21 can be dispersed when the constituent members of the solenoid 100 thermally expand when the linear solenoid valve 300 is driven or the like. It is possible to prevent the performance of the solenoid 100 from deteriorating. Further, since the protrusions 520 are formed at three locations along the circumferential direction, it is possible to prevent the breathing path 28 from being excessively blocked and impairing the function of the breathing path 28 in comparison with the configuration in which the protrusions are formed at four or more locations along the circumferential direction. Further, since the plurality of protrusions 520 are formed side by side in the circumferential direction at positions surrounding the central axis AX, it is possible to further suppress the coil portion 20 from being eccentric with respect to the side surface portion 12 of the yoke 10.

Further, each protrusion 520 is formed at a position where it overlaps with the coil portion end 23 when viewed in the radial direction. Here, the strength of the coil portion end 23 is increased by the connector portion 26 as compared with the other portion of the coil portion 20 in the axial direction AD. Therefore, by forming the protrusion 520 at a position where it overlaps with the coil portion end 23 in the radial direction, the strength of the protrusion 520 can be increased and the deformation of the protrusion 520 can be suppressed.

Further, since the protrusion 520 is in contact with the inner surface 13 of the side surface portion 12, it is possible to further suppress the coil portion 20 from being eccentric with respect to the side surface portion 12 of the yoke 10.

Further, the sliding core 60 has the tubular core portion 61 arranged radially outside with respect to the plunger 30 and the magnetic flux transfer portion 65 formed from the core end portion 62 of the core portion 61 toward the outer side in the radial direction to transfer magnetic flux. Therefore, there is almost no radial gap between the core portion 61 and the magnetic flux transfer portion 65, and it is possible to prevent the core portion 61 and the magnetic flux transfer portion 65 from being eccentric. Therefore, when the magnetic circuit C1 is configured by energization, it is possible to suppress the occurrence of radial bias in the distribution of the magnetic flux transmitted from the magnetic flux transfer portion 65 to the plunger 30 via the core portion 61, and it is possible to suppress an increase in side force due to a bias in the distribution of magnetic flux.

B. Second Embodiment

A solenoid of a second embodiment is different from the solenoid 100 of the first embodiment in that the yoke 10a and the coil portion 20a are provided instead of the yoke 10 and the coil portion 20. More specifically, in the solenoid 100 of the first embodiment, the protrusion 520a is formed on the inner surface 13 of the side surface portion 12a of the yoke 10a instead of the protrusion 520 formed on the outer surface 25 of the coil portion 20. Since the other configurations are the same as those of the solenoid 100 of the first embodiment, the same configurations are designated by the same reference numerals, and detailed description thereof will be omitted.

Figure 6:
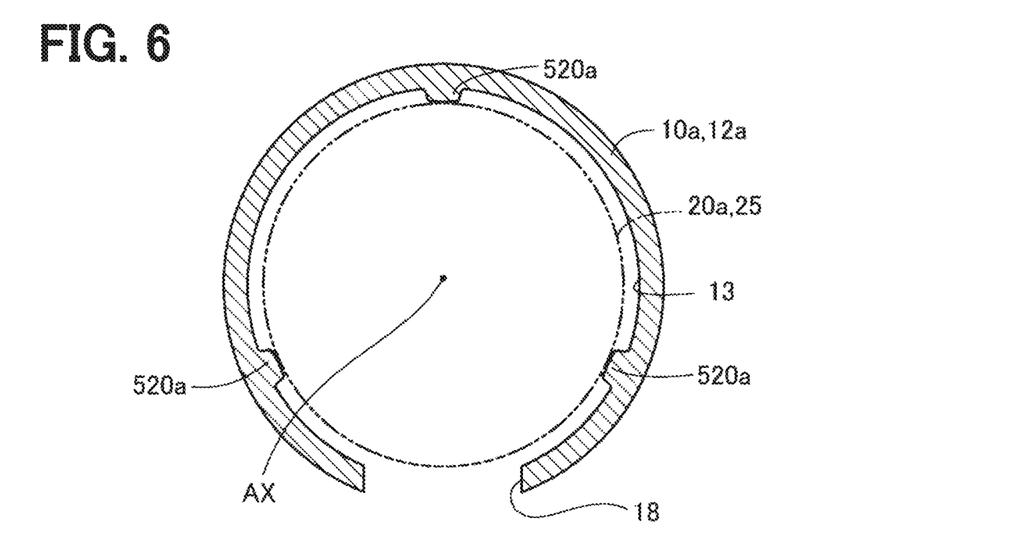
FIG. 6 is an explanatory diagram illustrating a protruding portion of a second embodiment.

In FIG. 6, only the yoke 10a is extracted and shown in the same cross section as in FIG. 3, and the outer surface 25 of the coil portion 20a is shown by a chain double-dashed line for convenience of explanation. As shown in FIG. 6, three protrusions 520a projecting inward in the radial direction are formed on the inner surface 13 of the side surface portion 12a of the yoke 10a of the second embodiment. Like the protrusions 520 of the first embodiment, the protrusions 520a are formed at a position where it overlaps the coil portion end 23 (not shown in FIG. 6) in the radial direction. Further, the protrusion 520a includes a tapered portion having a slope extending from the inside to the outside in the radial direction from the base end portion 34 side to the distal end portion 32 side of the plunger 30 in the axial direction AD. Therefore, the dimension of the radial gap between the inner surface 13 and the outer surface 25 is gradually increased along the direction from the base end portion 34 to the distal end portion 32 of the plunger 30 in the range in which the tapered portion is formed in the axial direction AD.

According to the solenoid of the second embodiment described above, the same effect as that of the first embodiment is obtained. In addition, since the protrusion 520a is formed so as to protrude inward in the radial direction on the inner surface 13 of the side surface portion 12a, it is possible to prevent the configuration of the coil portion 20a from becoming complicated.

C. Third Embodiment

A solenoid of a third embodiment is different from the solenoid 100 of the first embodiment in that the energized portion 29b is provided instead of the energized portion 29. Since the other configurations are the same as those of the solenoid 100 of the first embodiment, the same configurations are designated by the same reference numerals, and detailed description thereof will be omitted.

Figure 7:
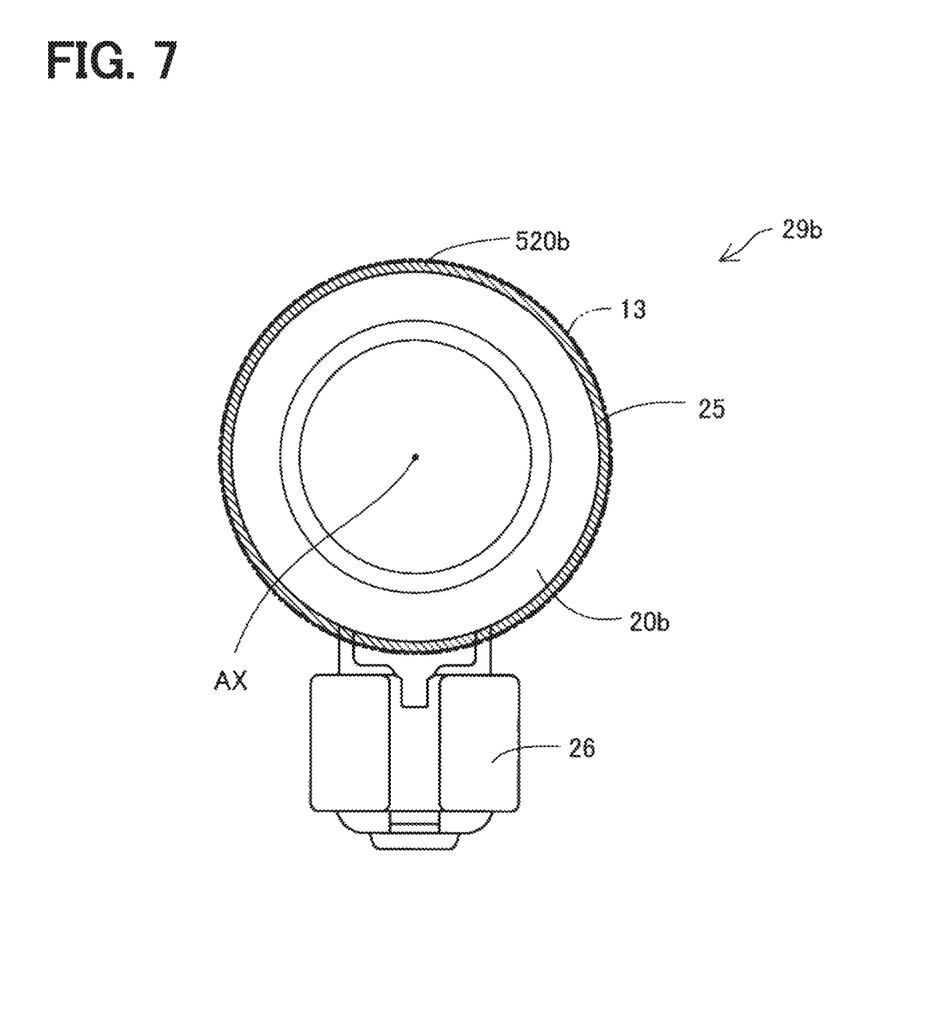
FIG. 7 is a front view showing a energized portion of a third embodiment.
Figure 8:
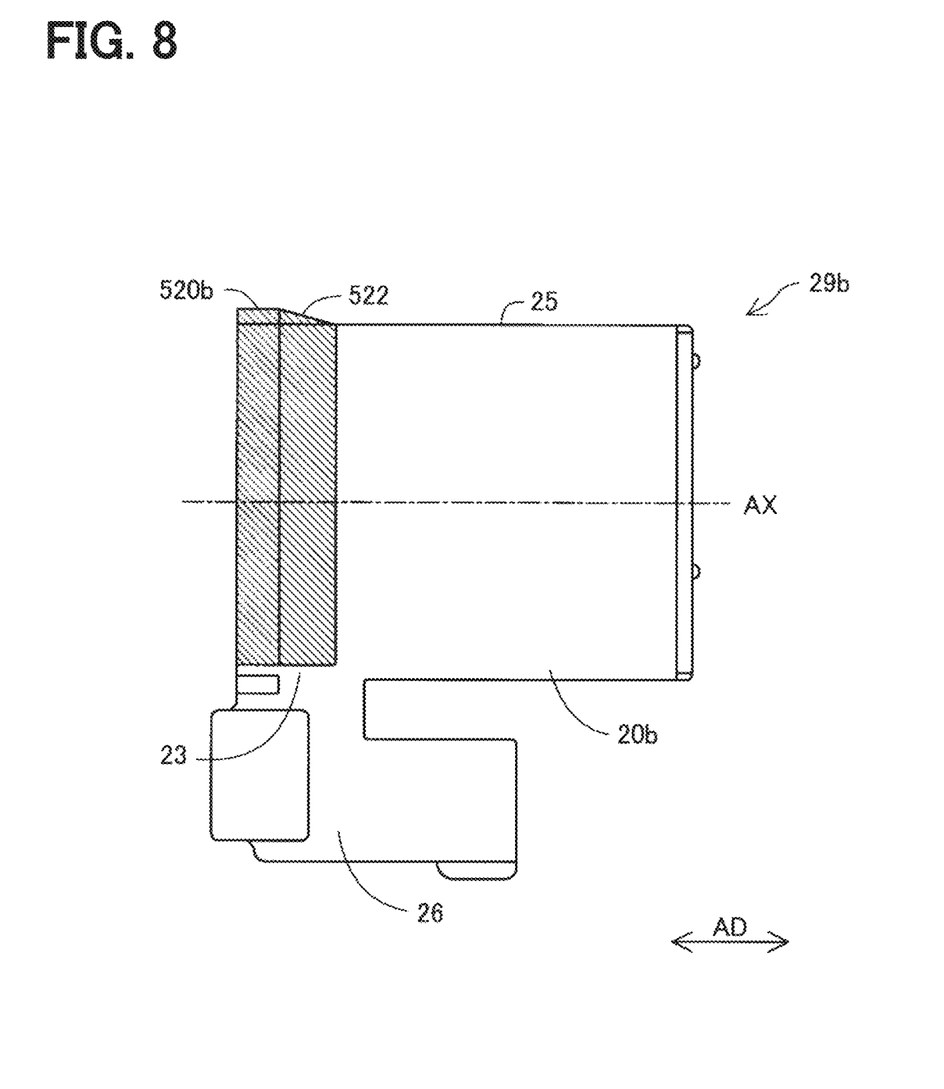
FIG. 8 is a side view showing the energized portion of the third embodiment.

As shown in FIGS. 7 and 8, the energized portion 29b in the solenoid of the third embodiment includes the coil portion 20b instead of the coil portion 20. A protrusion 520b is formed on the outer surface 25 of the coil portion 20b instead of the protrusion 520. The protrusion 520b is formed over the entire circumferential direction. Like the protrusions 520 of the first embodiment, the protrusion 520b includes a tapered portion 522 having a slope extending from the inside to the outside in the radial direction from the base end portion 34 side to the distal end portion 32 side of the plunger 30 in the axial direction AD. The tapered portion 522 has a tapered shape in which the diameter gradually increases along the direction from the base end portion 34 to the distal end portion 32 of the plunger 30 in the axial direction AD.

According to the solenoid of the third embodiment described above, the same effect as that of the first embodiment is obtained. In addition, since the protrusion 520b is formed over the entire circumferential direction, it is possible to suppress partial concentration of pressure in the circumferential direction when molding the coil portion 20 using a molding die. Therefore, partial wear of the molding die can be suppressed, and shortening of the mold life of the molding die can be suppressed. Further, since the protruding portion 520b is formed at a position where it overlaps with the coil portion end 23 in the radial direction, it is possible to suppress the inhibition of the function of the breathing path 28.

D. Fourth Embodiment

Figure 9:
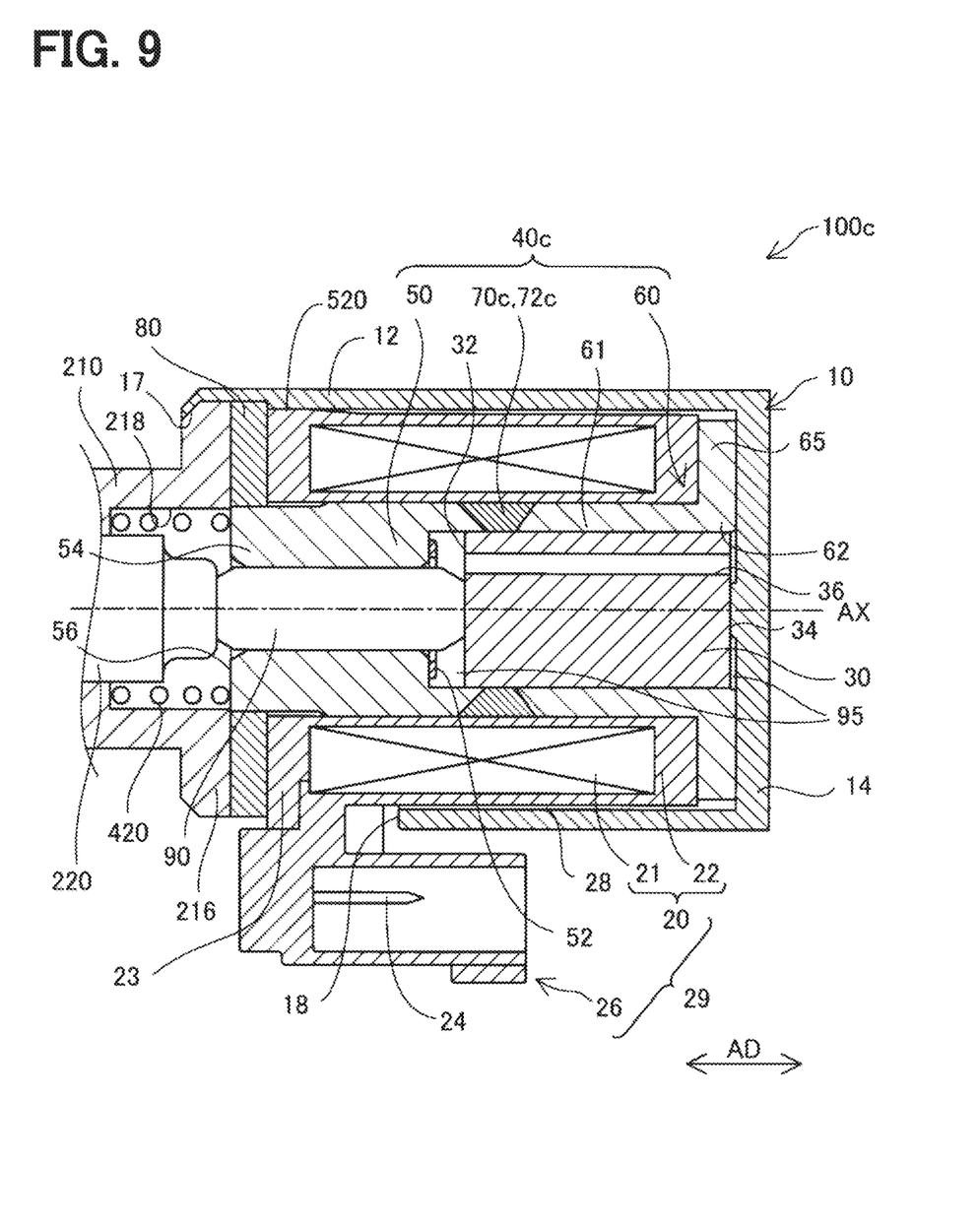
FIG. 9 is a cross-sectional view showing a detailed configuration of a solenoid according to a fourth embodiment.

A solenoid 100c of a fourth embodiment shown in FIG. 9 is different from the solenoid 100 of the first embodiment in that it includes a stator core 40c having a magnetic flux passage suppressing portion 70c instead of the magnetic flux passage suppressing portion 70. Since the other configurations are the same as those of the solenoid 100 of the first embodiment, the same configurations are designated by the same reference numerals, and detailed description thereof will be omitted.

The magnetic flux passage suppressing portion 70c in the solenoid 100c of the fourth embodiment includes a connecting portion 72c formed of a non-magnetic material. The connecting portion 72c physically connects the magnetic attraction core 50 and the sliding core 60, which are formed as separate bodies from each other. In the present embodiment, the connecting portion 72c has a wall thickness substantially equal to that of the core portion 61, and is formed by brazing or the like. Further, in the present embodiment, the connecting portion 72c is formed of austenitic stainless steel, but is not limited to austenitic stainless steel, and may be formed of any non-magnetic material such as aluminum or brass.

According to the solenoid 100c of the fourth embodiment described above, the same effect as that of the first embodiment is obtained. In addition, since the magnetic flux passage suppressing portion 70c includes the connecting portion 72c formed of a non-magnetic material, when energized, it is possible to further suppress the direct passage of the magnetic flux from the core portion 61 to the magnetic attraction core 50 without passing through the plunger 30. Further, since the connecting portion 72c is formed to have a wall thickness substantially equal to that of the core portion 61, the magnetic attraction core 50 and the core portion 61 can be more firmly connected, and the plunger 30 also slides in the connecting portion 72c.

E. Fifth Embodiment

Figure 10:
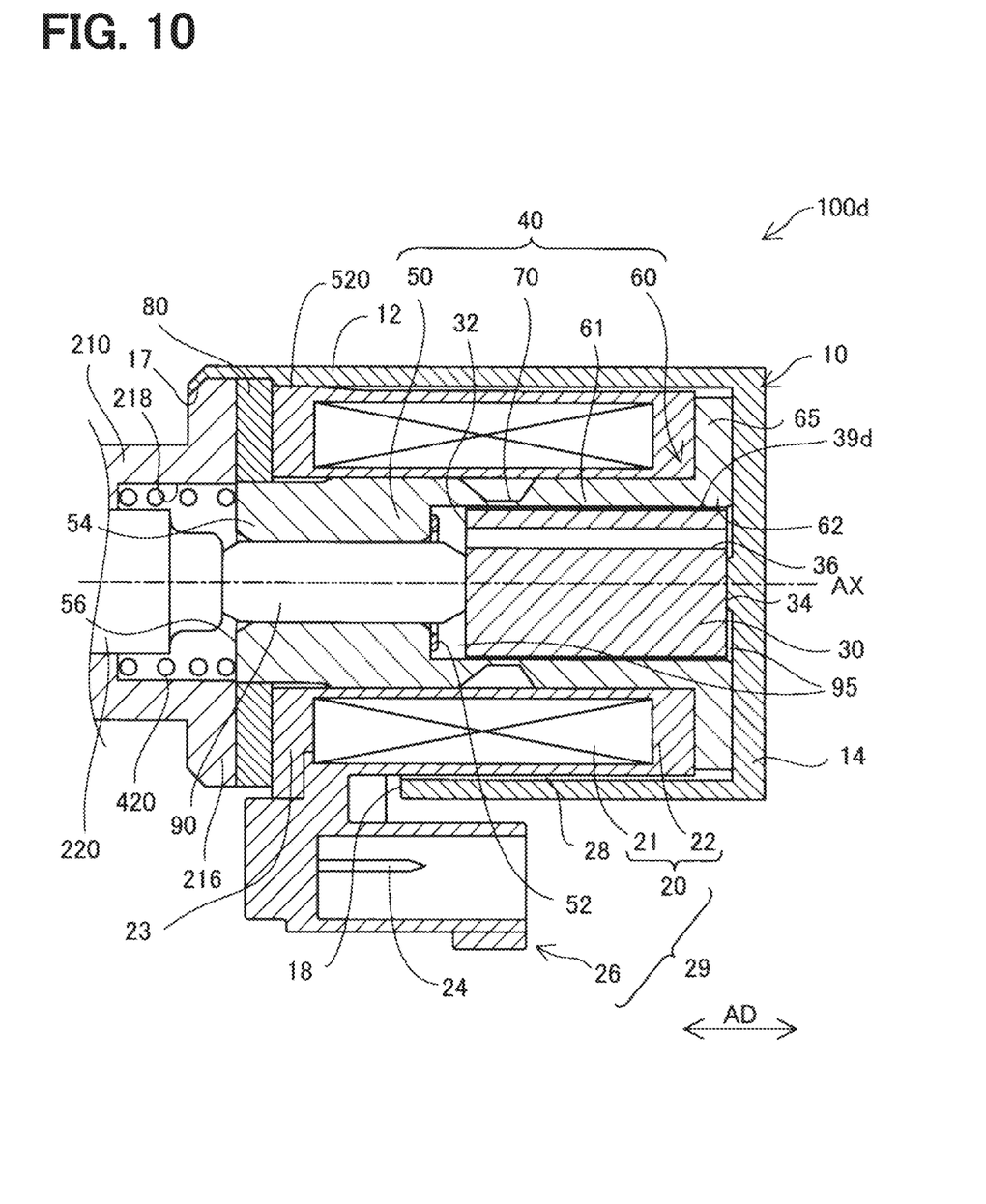
FIG. 10 is a cross-sectional view showing a detailed configuration of a solenoid according to a fifth embodiment.

A solenoid 100d of a fifth embodiment shown in FIG. 10 is different from the solenoid 100 of the first embodiment in that the plunger 30d is provided in place of the plunger 30. Since the other configurations are the same as those of the solenoid 100 of the first embodiment, the same configurations are designated by the same reference numerals, and detailed description thereof will be omitted.

In the plunger 30d of the fifth embodiment, a plating treatment of the outer peripheral surface is omitted, and the outer peripheral surface is covered with the film member 39d. The film member 39d is formed of a Teflon sheet (Teflon is a registered trademark) and is wound around a plunger 30d. In addition, it is not limited to Teflon and may be formed of any other non-magnetic material. Further, the film member 39d of the present embodiment covers the plunger 30d over the entire length of the plunger 30d in the axial direction AD on the outer peripheral surface, that is, the radially outer surface of the plunger 30d. The film member 39d does not need to cover the entire length of the axial AD of the plunger 30d, and may cover at least a part of the outer peripheral surface of the plunger 30d including the sliding portion of the plunger 30d.

According to the solenoid 100d of the fifth embodiment described above, the same effect as that of the first embodiment is obtained. In addition, since the film member 39d formed of a non-magnetic material and covering at least a part of the outer peripheral surface of the plunger 30d is further provided, the plating process of the outer peripheral surface of the plunger 30d can be omitted, and it is possible to suppress an increase in the cost required for manufacturing the plunger 30d.

F. Other Embodiments (1) The configurations of the protrusions 520 and 520a to b in each of the above embodiments are merely examples and can be changed in various ways. For example, the tapered portion 522 may be formed over the entire protrusions 520, 520a, and 520b along the axial direction AD, or the tapered portion 522 may be omitted. Further, for example, protrusions 520 and 520a to b may be formed on both the outer surface 25 of the coil portions 20 and 20a to b and the inner surface 13 of the side surface portions 12 and 12a of the yokes 10 and 10a, respectively. Further, for example, the protrusions 520 and 520a of the first, second, fourth, and fifth embodiments are not limited to being formed at a position where they overlap the coil portion end 23 when viewed in the radial direction, and may be formed at a position where they do not overlap the coil portion end 23 when viewed in the radial direction. That is, the protrusions may be formed so that the position in the axial direction AD deviates from the coil portion end 23 when viewed in the radial direction, and the protrusions may be formed over the entire side surface portions 12, 12a and the entire coil portions 20, 20a along the axial direction AD. Further, for example, the protrusions 520 and 520a of the first, second, fourth, and fifth embodiments may be formed at a position overlapping the circumferential position of the connector portion 26. In such a configuration, in order not to interfere with the function of the breathing path 28, for example, an end of the protrusions 520 and 520a on the bottom portion 14 side in the axial AD may be located on the spool valve 200 side in the axial direction AD with respect to an end of the notch 18 on the bottom portion 14 side in the axial AD. Further, the end of the protrusion may be configured that the fluid passes along the tapered portion 522. Further, for example, the protrusions 520 and 520a of the first, second, fourth, and fifth embodiments may be formed side by side at different intervals in the circumferential direction, and are formed at four or more locations in the circumferential direction. That is, in general, the protrusions 520, 520a to b that project in the radial direction and reduce the dimension of at least a part of the radial gap between the inner surface 13 and the outer surface 25 may be formed on at least one of the inner surface 13 and the outer surface 25. Even with such a configuration, the same effect as that of each of the above described embodiments can be obtained.

(2) The configurations of the solenoids 100 and 100c to d of each of the above embodiments are merely examples and can be changed in various ways. For example, in place of the notch 18, or in addition to the notch 18, any through hole radially formed in the side surface portions 12 and 12a of the yokes 10 and 10a may function as an inflow portion of the fluid existing in the mounting environment of the solenoids 100, 100c to d. Further, for example, the core portion 61 of the sliding core 60 and the magnetic flux transfer portion 65 may be formed separately from each other. In such a configuration, the core portion 61 may be press-fitted into the inner hole of the magnetic flux transfer portion 65 formed in an annular shape. Further, for example, the elastic member 420 is not limited to the compression coil spring, and may be composed of any elastic member such as a disc spring or a leaf spring. The elastic member 420 may be arranged between the coil portions 20, 20a to b and the magnetic flux transfer portion 65 in the axial direction AD instead of the elastic member accommodating portion 218 to urge the magnetic flux transfer portion 65. Further, for example, the ring member 80 may be formed integrally with the magnetic attraction core, and the magnetic flux transfer portion 65 may be formed separately from the core portion 61. Even with such a configuration, the same effect as that of each of the above described embodiments can be obtained.

(3) In the solenoid 100c of the fourth embodiment, the connecting portion 72c is formed to have a wall thickness substantially equal to that of the core portion 61, but is formed to be thinner than the core portion 61 and may physically connect between the magnetic attraction core 50 and the sliding core 60 on the inner peripheral surface of the coil portion 20. Even with such a configuration, the same effect as that of the fourth embodiment can be obtained.

(4) In the solenoid 100d of the fifth embodiment, the sheet-shaped film member 39d is wound around the plunger 30d, but the film member 39d is formed not only by winding the sheet but also by coating the outer peripheral surface of the plunger 30d. Further, since the inner peripheral surface of the sliding core 60 is coated with a non-magnetic material, at least a part of the outer peripheral surface of the plunger 30d may be covered with the film member 39d. Even with such a configuration, the same effect as that of the fifth embodiment can be obtained.

(5) The solenoids 100, 100c, 100d of each of the above embodiments are applied to the linear solenoid valve 300 for controlling the hydraulic pressure of the hydraulic oil supplied to the automatic transmission for vehicles, and function as an actuator for driving the spool valve 200. However, the present disclosure is not limited to this configuration. For example, the solenoid is not limited to being mounted on the valve body provided on the outer surface of the transmission case, but may be mounted on any hydraulic device that requires control of the hydraulic system, for example, it may be applied to a valve timing adjusting device or the like for adjusting the valve timing of an intake valve or an intake valve of the engine. Further, for example, instead of the spool valve 200, an arbitrary valve such as a poppet valve may be driven, and instead of the valve, an arbitrary driven body such as a switch may be driven.

The present disclosure should not be limited to the embodiments described above, and various other embodiments may be implemented without departing from the scope of the present disclosure. For example, the technical features in each embodiment corresponding to the technical features in the form described in the summary may be used to solve some or all of the above-described problems, or to provide one of the above-described effects. In order to achieve a part or all, replacement or combination can be appropriately performed. Also, if the technical features are not described as essential in the present specification, they can be deleted as appropriate.

What is claimed is:

1. A solenoid, comprising:
a coil portion having a coil that generates a magnetic field when energized;
a yoke including a side surface portion along an axial direction and a bottom portion formed along a direction intersecting the axial direction, and being configured to accommodate the coil portion;
a cylindrical core portion that is disposed inside the coil portion in a radial direction perpendicular to the axial direction;
a columnar plunger that slides inside the core portion in the radial direction in the axial direction;
a magnetic attraction core arranged in the axial direction to face a distal end portion of the plunger and configured to attract magnetically the plunger by a magnetic force generated by the coil;
a first magnetic flux transfer portion configured to transfer a magnetic flux between the yoke and the core portion on a radial outside of a core end portion, which is an axial end of the core portion and faces the bottom portion;
a second magnetic flux transfer portion configured to transfer the magnetic flux between the magnetic attraction core and the side surface portion on a radial outside of the magnetic flux that is disposed radially outside a magnetic attraction core end, which is an end in the axial direction of the magnetic attraction core and is opposite to a side facing the distal end portion; and
a magnetic flux passage suppressing portion configured to suppress a passage of magnetic flux between the core portion and the magnetic attraction core; wherein
a gap in the radial direction that communicates a radial outside of the first magnetic flux transfer portion with an outside of the solenoid is formed between an inner surface of the side surface portion and an outer surface of the coil portion, and
a protrusion is formed on at least one of the inner surface and the outer surface and protrudes in the radial direction to reduce a size of at least a part of the gap.

2. The solenoid according to claim 1, wherein
the protrusion is formed on the outer surface so as to project outward in the radial direction.

3. The solenoid according to claim 1, wherein
the protrusion is formed on the inner surface so as to project inward in the radial direction.

4. The solenoid according to claim 1, wherein
the protrusion has a tapered portion having a slope extending from the inside to the outside in the radial direction from a base end portion side to the distal end portion side of the plunger in the axial direction.

5. The solenoid according to claim 1, wherein
an end of the coil portion in the axial direction on a side where the second magnetic flux transfer portion is arranged is exposed from the yoke and connects a connector portion to connect the coil and an electronic control unit, and
the protrusion is formed at a position overlapping the end of the coil portion when viewed in the radial direction.

6. The solenoid according to claim 1, wherein
the protrusions are formed at three or more locations along the circumferential direction.

7. The solenoid according to claim 5, wherein
the protrusion is formed over the entire circumferential direction.

8. The solenoid according to claim 1, wherein
the magnetic flux passage suppressing portion includes a non-magnetic connecting portion that physically connects the magnetic attraction core and the sliding core which are formed separately from each other.

9. The solenoid according to claim 1, further comprising:
a film member being formed of a non-magnetic material and configured to cover at least a part of an outer peripheral surface of the plunger.

* * * * *